United States Patent
Eguchi et al.

(10) Patent No.: US 11,574,649 B1
(45) Date of Patent: Feb. 7, 2023

(54) VIBRATION SENSOR FEEDFORWARD CONTROL FOR MAGNETIC STORAGE DEVICE

(71) Applicant: Western Digital Technologies, Inc., San Jose, CA (US)

(72) Inventors: Takehiko Eguchi, Tokyo (JP); Kazuhide Ichikawa, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/519,434

(22) Filed: Nov. 4, 2021

(51) Int. Cl.
*G11B 5/55* (2006.01)
*G11B 5/596* (2006.01)

(52) U.S. Cl.
CPC ........ *G11B 5/5582* (2013.01); *G11B 5/59627* (2013.01)

(58) Field of Classification Search
None
See application file for complete search history.

(56) References Cited

U.S. PATENT DOCUMENTS

| | | | |
|---|---|---|---|
| 6,377,420 B1 * | 4/2002 | Tadepalli | G11B 33/121 |
| 6,757,140 B1 * | 6/2004 | Hawwa | G11B 5/5552 |
| 6,934,116 B2 | 8/2005 | Iwashiro | |
| 7,312,941 B2 * | 12/2007 | Hirano | G11B 5/4826 |
| 7,375,916 B2 | 5/2008 | Semba et al. | |
| 8,794,073 B2 | 8/2014 | Kasai et al. | |
| 2003/0128475 A1 * | 7/2003 | Wehrenberg | G11B 19/08 73/488 |
| 2003/0206366 A1 * | 11/2003 | Blick | G11B 5/5552 |

(Continued)

FOREIGN PATENT DOCUMENTS

| | | |
|---|---|---|
| EP | 1768111 | 3/2007 |
| JP | 2003228956 | 8/2003 |
| JP | 2011047452 | 7/2012 |

OTHER PUBLICATIONS

Usui, et al., Reduction of external vibration in hard disk drives using adaptive feed-forward control with single shock sensor, IEEE, 2006, pp. 138-142.

(Continued)

*Primary Examiner* — Peter Vincent Agustin
(74) *Attorney, Agent, or Firm* — Kunzler Bean & Adamson

(57) ABSTRACT

A magnetic storage device that includes a housing, including a base, a cover, and an interior cavity. The magnetic storage device also includes an actuator controller, located in the interior cavity and configured to generate an actuator command signal. The magnetic storage device further includes an actuatable component, located in the interior cavity, and an actuator, located in the interior cavity and operable to actuate the actuatable component in response to the actuator command signal. The magnetic storage device also includes a vibration sensor, located in the interior cavity and configured to detect a vibration of the cover. The magnetic storage device further includes a sensor feedforward controller, located in the interior cavity and configured to generate a gain signal, based on the vibration of the cover detected by the vibration sensor, and to modify the actuator command signal proportional to the gain signal.

20 Claims, 8 Drawing Sheets

(56) References Cited

U.S. PATENT DOCUMENTS

| | | | | |
|---|---|---|---|---|
| 2004/0218494 | A1* | 11/2004 | Lee | G11B 7/08505 |
| | | | | 369/53.13 |
| 2004/0240098 | A1* | 12/2004 | Ito | G11B 21/12 |
| 2006/0235640 | A1* | 10/2006 | Hirano | G11B 5/5569 |
| 2007/0253089 | A1* | 11/2007 | Hayashi | G11B 19/04 |
| | | | | 360/73.03 |
| 2008/0229842 | A1* | 9/2008 | Ohtsuka | G11B 5/5582 |
| | | | | 29/25.35 |
| 2009/0279210 | A1* | 11/2009 | Rappel | G11B 5/54 |
| | | | | 360/245.4 |
| 2010/0067357 | A1 | 3/2010 | Huang et al. | |
| 2017/0309312 | A1* | 10/2017 | Daugela | G11B 33/10 |

OTHER PUBLICATIONS

Jinzenji, et al., Acceleration Feedforward Control Against Rotational Disturbance in Hard Disk Drives, IEEE Transactions on Magnetics, Mar. 2001, pp. 888-893, vol. 37, No. 2.

* cited by examiner

VIBRATION SENSOR FEEDFORWARD CONTROL FOR MAGNETIC STORAGE DEVICE

FIELD

This disclosure relates generally to magnetic storage devices, and more particularly to reducing actuator position errors of a magnetic storage device caused by vibration of the magnetic storage device.

BACKGROUND

Magnetic storage devices, such as hard disk drives, include several actuatable components. Precisely controlling the position of some actuatable components of magnetic storage devices is important to the overall performance and reliability of the magnetic storage devices. However, certain factors, such as vibration of the magnetic storage devices can cause the actuatable components to experience position errors. Position errors occur when the actual position of the actuatable components is different than a desired or expected position of the actuatable components.

Conventional techniques for reducing position errors rely solely on feedback control. However, adequately compensating for certain types and magnitudes of vibrations using conventional feedback control techniques can be difficult.

SUMMARY

The subject matter of the present application has been developed in response to the present state of the art, and, in particular, in response to the problems and needs of conventional magnetic storage devices. In view of the foregoing, the subject matter of the present application has been developed to provide magnetic storage devices and corresponding methods, that overcome at least some of the shortcomings of the prior art.

Disclosed herein is a magnetic storage device that comprises a housing, comprising a base, a cover enclosing the base, and an interior cavity defined between the base and the cover. The magnetic storage device also comprises an actuator controller, located in the interior cavity and configured to generate an actuator command signal. The magnetic storage device further comprises an actuatable component, located in the interior cavity. The magnetic storage device additionally comprises an actuator, located in the interior cavity and operable to actuate the actuatable component in response to the actuator command signal. The magnetic storage device also comprises a vibration sensor, located in the interior cavity and configured to detect a vibration of the cover. The magnetic storage device further comprises a sensor feedforward controller, located in the interior cavity and configured to generate a gain signal, based on the vibration of the cover detected by the vibration sensor, and to modify the actuator command signal proportional to the gain signal. The preceding subject matter of this paragraph characterizes example 1 of the present disclosure.

The sensor feedforward controller comprises a low-pass filter and a gain circuit that cooperatively convert a sensor signal, representing the vibration of the cover detected by the vibration sensor, from the vibration sensor to a gain signal. The sensor feedforward controller modifies the actuator command signal by adding the gain signal to the actuator command signal. The preceding subject matter of this paragraph characterizes example 2 of the present disclosure, wherein example 2 also includes the subject matter according to example 1, above.

The magnetic storage device further comprises a position error signal (PES) sensor, located in the interior cavity and configured to generate a PES based on an error in a sensed position of the actuatable component being different than an expected position of the actuatable component, and an actuator feedback controller, located in the interior cavity and configured to generate an actuator feedback control signal based on the PES. The actuator controller is configured to generate the actuator command signal based on the actuator feedback control signal. The preceding subject matter of this paragraph characterizes example 3 of the present disclosure, wherein example 3 also includes the subject matter according to any one of examples 1-2, above.

The magnetic storage device further comprises a flex bracket, located in the interior cavity and fixed to the base, and a flex cable, located in the interior cavity, and coupled to and extending between the flex bracket and the actuatable component. The vibration sensor is engaged with the flex bracket. The preceding subject matter of this paragraph characterizes example 4 of the present disclosure, wherein example 4 also includes the subject matter according to any one of examples 1-3, above.

The vibration sensor is engaged with the flex bracket such that relative movement between the flex bracket and the cover is detected by the vibration sensor. The preceding subject matter of this paragraph characterizes example 5 of the present disclosure, wherein example 5 also includes the subject matter according to example 4, above.

The vibration sensor is fixed to the cover such that the vibration sensor does not move relative to the cover. The preceding subject matter of this paragraph characterizes example 6 of the present disclosure, wherein example 6 also includes the subject matter according to example 5, above.

The vibration sensor is a force sensor. The force sensor is interposed between the cover and the flex bracket. The force sensor directly contacts the flex bracket. The preceding subject matter of this paragraph characterizes example 7 of the present disclosure, wherein example 7 also includes the subject matter according to example 6 above.

The vibration sensor is an acceleration sensor. The magnetic storage device further comprises a compliant member, having a flexibility greater than that of the acceleration sensor and the flex bracket. The compliant member is fixed to the acceleration sensor. The acceleration sensor is interposed between the cover and the compliant member. The compliant member is interposed between the acceleration sensor and the flex bracket. The compliant member directly contacts the flex bracket. The preceding subject matter of this paragraph characterizes example 8 of the present disclosure, wherein example 8 also includes the subject matter according to any one of examples 6-7, above.

The vibration sensor is engaged with the flex bracket and is configured to detect deformation of the flex bracket. The preceding subject matter of this paragraph characterizes example 9 of the present disclosure, wherein example 9 also includes the subject matter according to example 4, above.

The vibration sensor is a strain sensor fixed to the flex bracket such that the strain sensor does not move relative to the flex bracket. The flex bracket directly contacts the cover. The preceding subject matter of this paragraph characterizes example 10 of the present disclosure, wherein example 10 also includes the subject matter according to example 9 above.

The actuatable component comprises a carriage. The actuator comprises a voice coil motor (VCM). The actuator controller comprises a VCM controller. The preceding subject matter of this paragraph characterizes example 11 of the present disclosure, wherein example 11 also includes the subject matter according to any one of examples 1-10, above.

Further disclosed herein is a magnetic storage device. The magnetic storage device comprises a housing, comprising a base, a cover enclosing the base, and an interior cavity defined between the base and the cover. The magnetic storage device also comprises an actuatable component, located in the interior cavity. The magnetic storage device further comprises a flex bracket, located in the interior cavity and fixed to the base. The magnetic storage device additionally comprises a flex cable, located in the interior cavity, and coupled to and extending between the flex bracket and the actuatable component. The magnetic storage device also comprises a vibration sensor, located in the interior cavity and configured to detect a vibration of the cover. The vibration sensor is engaged with the flex bracket such that relative movement between the flex bracket and the cover is detected by the vibration sensor or deformation of the flex bracket is detected by the vibration sensor. The preceding subject matter of this paragraph characterizes example 12 of the present disclosure.

The vibration sensor detects relative movement between the flex bracket and the cover. The vibration sensor is a force sensor, fixed to the cover such that the force sensor does not move relative to the cover. The force sensor is interposed between the cover and the flex bracket. The force sensor directly contacts the flex bracket. The preceding subject matter of this paragraph characterizes example 13 of the present disclosure, wherein example 13 also includes the subject matter according to example 12 above.

The vibration sensor detects relative movement between the flex bracket and the cover. The vibration sensor is an acceleration sensor, fixed to the cover such that the acceleration sensor does not move relative to the cover. The magnetic storage device further comprises a compliant member, having a flexibility greater than that of the acceleration sensor and the flex bracket. The compliant member is fixed to the acceleration sensor. The acceleration sensor is interposed between the cover and the compliant member. The compliant member is interposed between the acceleration sensor and the flex bracket. The compliant member directly contacts the flex bracket. The preceding subject matter of this paragraph characterizes example 14 of the present disclosure, wherein example 14 also includes the subject matter according to example 12, above.

The vibration sensor detects deformation of the flex bracket. The vibration sensor is a strain sensor fixed to the flex bracket such that the strain sensor does not move relative to the flex bracket. The flex bracket directly contacts the cover. The preceding subject matter of this paragraph characterizes example 15 of the present disclosure, wherein example 15 also includes the subject matter according to example 12, above.

The actuatable component comprises a carriage. The actuator comprises a voice coil motor (VCM). The actuator controller comprises a VCM controller. The flex bracket directly contacts the cover. The preceding subject matter of this paragraph characterizes example 16 of the present disclosure, wherein example 16 also includes the subject matter according to any one of examples 12-15, above.

Additionally disclosed herein is a method of reducing position error of an actuatable component of a magnetic storage device. The method comprises detecting vibration of a cover of the magnetic storage device. The cover encloses a base of a housing, in which the actuatable component is located. The method also comprises generating a gain signal, based on the vibration of the cover. The method further comprises generating an actuator command signal. The method additionally comprises modifying the actuator command signal proportional to the gain signal. The method also comprises actuating the actuator in response to the actuator command signal after the actuator command signal is modified. The preceding subject matter of this paragraph characterizes example 17 of the present disclosure.

Modifying the actuator command signal comprises adding the gain signal to the actuator command signal. The preceding subject matter of this paragraph characterizes example 18 of the present disclosure, wherein example 18 also includes the subject matter according to example 17 above.

The method further comprises sensing a position of the actuator and generating a position error signal (PES) based on the position of the actuator. The actuator command signal is generated based on the PES. The preceding subject matter of this paragraph characterizes example 19 of the present disclosure, wherein example 19 also includes the subject matter according to any one of examples 17-18, above.

The vibration of the cover is detected by one of sensing relative movement between a flex bracket located in the housing and the cover of the housing, or sensing deformation of the flex bracket. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The subject matter of the present disclosure includes a magnetic storage device with a feedforward controller that helps reduce position errors of actuatable components of the magnetic storage device caused by vibration of the magnetic storage device. Vibrations of a magnetic storage devices caused by fan noise, such as that generated by fans in a storage server, contribute to the position errors of actuatable components. For example, fan noise vibrations can cause the cover of a housing of a magnetic storage device to vibrate, which can result in movement of actuatable components within the housing and thus a disruption in the positioning control of the actuatable components. In contrast to previous techniques for reducing such position errors, which rely solely on typical feedback controllers and actuatable-component position sensors, the magnetic storage device of the present disclosure utilizes a feedforward controller, and corresponding sensors to detect vibrations in a cover of the magnetic storage device, to promote a reduction in the position errors. In some instances, the feedforward controller, and corresponding cover vibration sensors, of the present disclosure enables a reduction of position errors, of a higher order, than can be accomplished by typical feedback controllers and corresponding actuatable-component position sensors.

Figure 1:
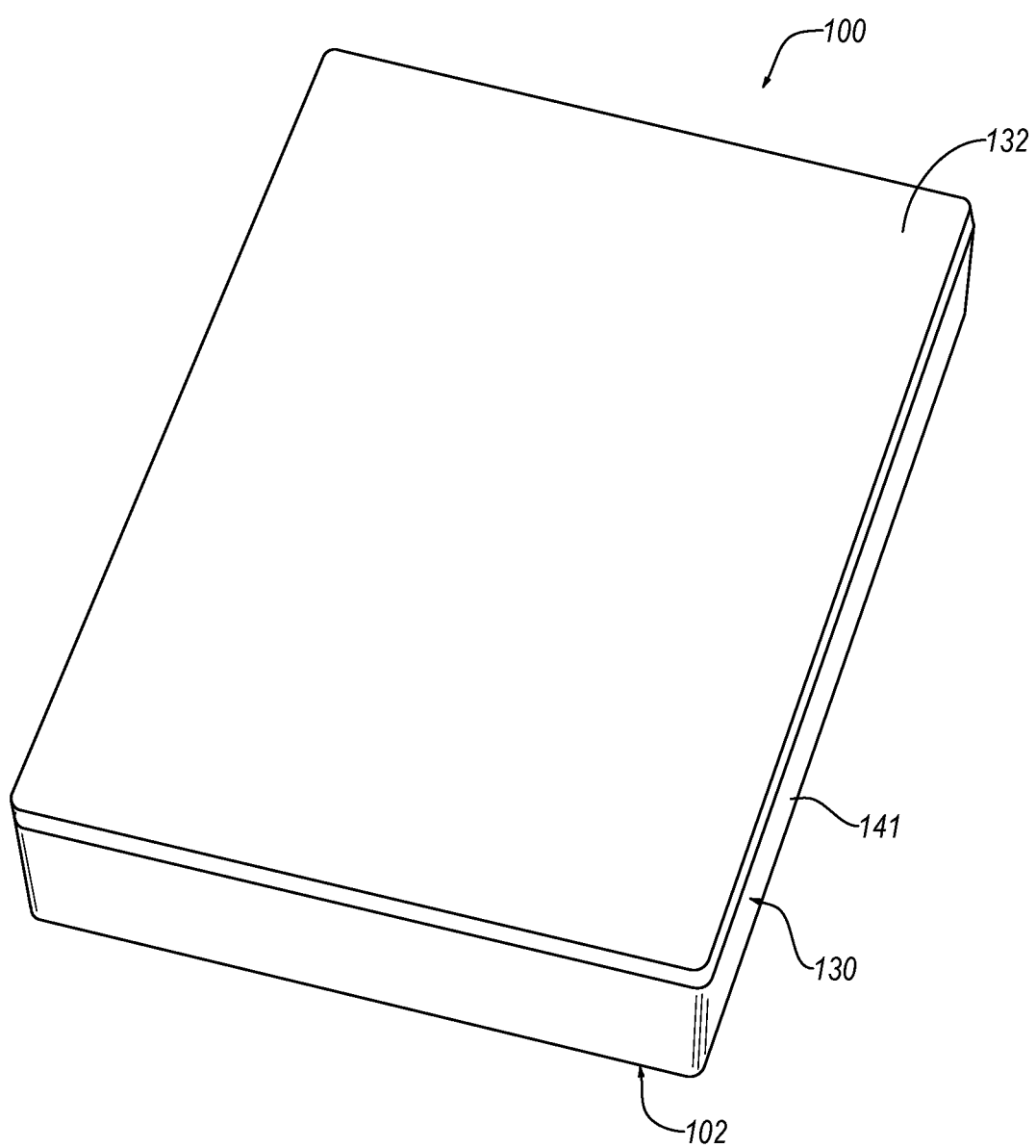
FIG. 1 is a perspective, schematic view of a magnetic storage device, according to one or more examples of the present disclosure.

Referring to FIG. 1, a magnetic storage device 100 (e.g., magnetic recording device), according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing (see, e.g., FIG. 2). The housing 102 includes a base 130 and a cover 132 (shown in dashed lines in FIG. 2 so as not to obscure internal features of the magnetic storage device 100 within the interior cavity 114 of the housing 102). The cover 132 is coupled to the base 130 to enclose the interior cavity 114 from the environment exterior to the housing 102. In some examples, a seal or gasket is positioned between the base 130 and the cover 132 to promote a hermetic seal between the base 130 and the cover 132. In some examples, the seal between the base 130 and the cover 132 is sufficiently strong to retain, over time, the environmental conditions within the interior cavity 114 at the time the housing 102 is sealed.

The base 130 includes a base plate 140 and sidewalls 141 extending perpendicularly away from the base plate 140. The sidewalls 141 define four sides of the housing 102 in some examples, such as with conventional rectangularly-shaped form factors. The cover 132 is attached to the sidewalls 141. Accordingly, the interior cavity 114 is defined as the space between the cover 132 and the base 130 (e.g., the sidewalls 141 and base plate 140 of the base 130). The cover 132 is a generally thin-walled, plate-like structure that has substantially the same outer peripherally shape as the base 130. In some examples, the housing 102, including the base 130 and the cover 132, is made of a rigid material, such as a metallic material.

Figure 2:
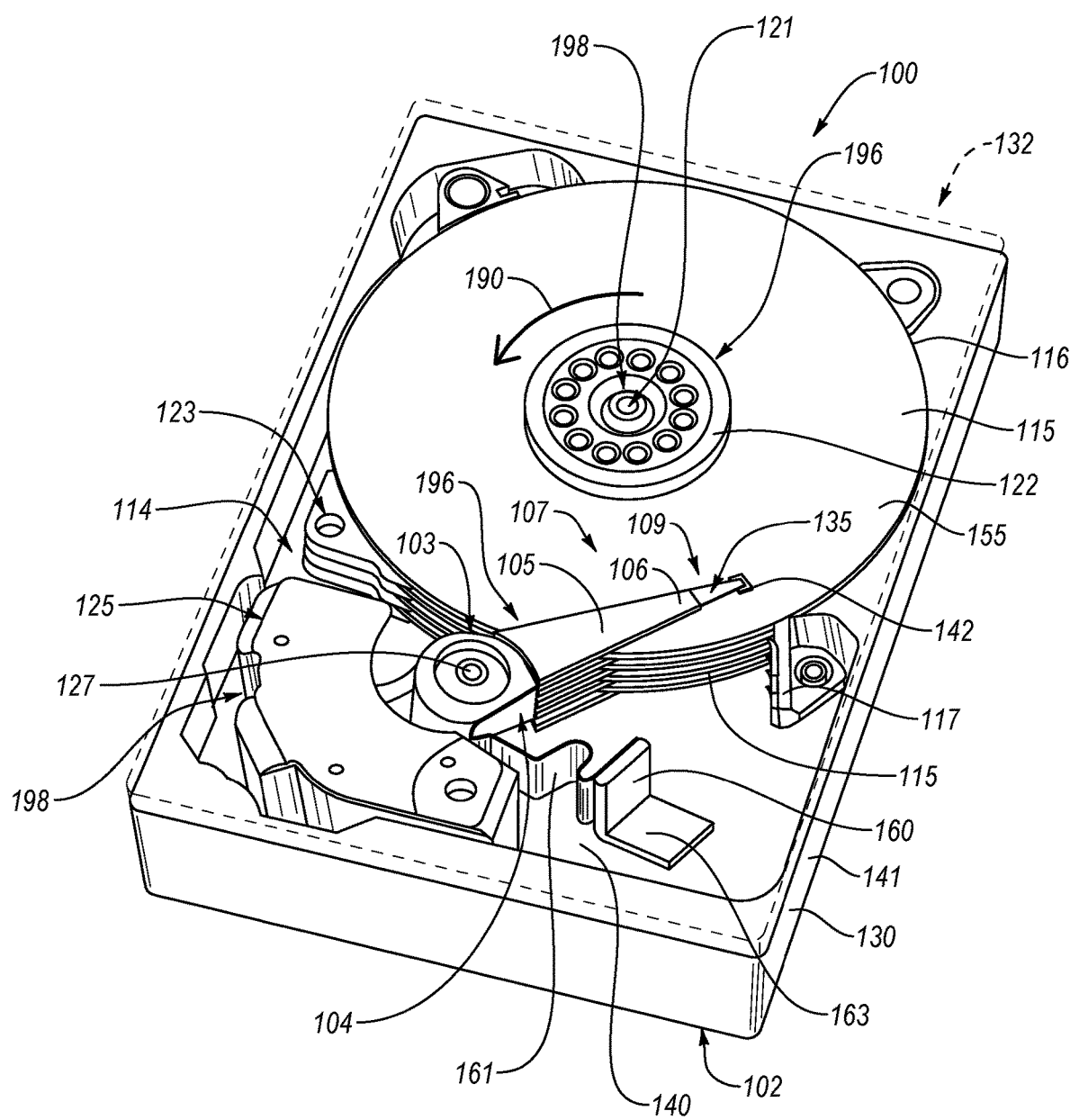
FIG. 2 is a perspective, schematic view of the magnetic storage device of FIG. 1, shown with a cover of a housing of the magnetic storage device in hidden view, according to one or more examples of the present disclosure.

Referring to FIG. 2, the magnetic storage device 100 includes various features located within the interior cavity 114 of the housing 102. The features include at actuatable components 196 and corresponding actuators 198. In some examples, one of the actuatable components 196 is a carriage 103 and one of the actuators 198 is a voice coil motor (VCM) 125. Alternatively, or additionally, in certain examples, one of the actuatable components 196 is a hub 122 and disks 115, and one of the actuators 198 is a spindle motor 121. Each of the spindle motor 121 and the VCM 125 includes at least one magnet, made of neodymium or similar material, that facilitate operation of the spindle motor 121 and the VCM 125, respectively. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. In the illustrated example of FIG. 2, only one head-gimbal assembly 109 is shown coupled to the distal tip of each carriage arm 105 of the plurality of carriage arms 105. However, it is noted that each carriage arm 105 may have another head-gimbal assembly 109 on an opposite side of the carriage arm, which mirrors the head-gimbal assembly 109 shown. Each head-gimbal assembly 109 includes a suspension assembly 135 and a slider 142.

Although the magnetic storage device 100 in FIG. 1 is shown to have five carriage arms 105 and four disks 115, in other examples the magnetic storage device 100 can have fewer or more than five carriage arms 105 or fewer or more than four disks 115. In one example, each side of each one of the carriage arms 105 facing a disk 115 has a head-gimbal assembly 109 (e.g., each one of bottom and top carriage arms 105 can have one head-gimbal assembly 109 and each one of middle carriage arms 105, between the bottom and top carriage arms 105, can have two head-gimbal assemblies 109). Similarly, although the magnetic storage device 100 is shown to have one spindle motor 121 and one VCM 125, in other examples, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. The stationary portion of the spindle motor 121, in some examples, is in contact with the cover 132 of the housing 102 and thus can be affected by vibrations in the cover 132. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic storage media. Generally, in one example, each disk 115 includes a substrate and a magnetic material applied directly or indirectly onto the substrate. For example, the magnetic material of the disks 115 may be conventional granular magnetic storage disks or wafers that have magnetic layer bits with multiple magnetic grains on each bit. In granular magnetic media, all of the bits are co-planar and the surface 116 of the disk is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125. The spindle 127, in some examples, is in contact with the cover 132 of the housing 102 and thus can be affected by vibrations in the cover 132, which can correspondingly affect the positioning of the head-gimbal assemblies 109 relative to the disks 115.

The carriage arms 105 are non-movably fixed to (e.g., integrally formed as a one-piece unitary monolithic body with) and extend away from a base of the carriage 103 in a spaced-apart manner relative to each other. In some implementations, each of the carriage arms 105 is spaced an equi-distance apart from and extend parallel relative to adjacent carriage arms 105. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 115, such that the head-gimbal assemblies 109 are parked or unloaded onto a ramp support 117 secured to the base 130.

For each head-gimbal assembly 109, the electrical signals are transmitted from and to a read-write head of the slider 142 via electrical traces or lines formed in or coupled to the slider 142. The electrical traces of the slider 142 are electrically interconnected to facilitate transmission of electrical signals between the read-write head and a control module 163 of the magnetic storage device 100. The control module 163 is configured to control the various components of the magnetic storage device 100 and to process the electrical signals and facilitate communication of the electrical signals between the magnetic storage device 100 and one or more external computing devices. Generally, the control module 163 includes software, firmware, and/or hardware used to control operation of the various components of the magnetic storage device 100. The control module 163 may include a printed circuit board on or in which the hardware is mounted.

Transmission of electrical signals from the sliders 142 to the control module 163 is facilitated by a flex cable 161 located within the interior cavity 114. Generally, the flex cable 161 is a flexible printed circuit board or ribbon that enables electrical interconnection between components that move relative to each other. Accordingly, the flex cable 161 includes one or more layers each having a flexible base insulator with flexible copper traces printed on one or both sides of the flexible base insulator. One end portion (e.g., flex circuit) of the flex cable 161 is attached to the carriage 103 and is co-movable with the carriage 103. An opposite end of the flex cable 161 is attached to a flex bracket 160, which helps to support the flex cable 161 in place relative to the base 130. Therefore, the flex cable 161 extends between the flex bracket 160 and the carriage 103, or other actuatable component.

In certain examples, the flex bracket 160 is an upright support (e.g., plate, tower, clamp, fixture, etc.) that is fixed to an inside surface 156 of the base plate 140 of the base 130 and extends within the interior cavity 114 away from the base 130 towards the cover 132. The inside surface 156 of the base plate 140 is opposite an outside surface 158 of the base plate 140. The flex bracket 160 is fixed to the base 130 such that the flex bracket 160 does not move relative to the base 130. In some examples, the flex bracket 160 has a height such that the flex bracket 160 does not contact the cover 132 (e.g., is short of the cover 132), when the cover 132 is attached to the base 130. However, in other examples, the flex bracket 160 has a height such that the flex bracket 160 contacts the cover 132 when the cover 132 is attached to the base 130.

In certain examples, the main purpose of the flex bracket 160 is to provide a support to which the flex cable 161 is attached. Additionally, the flex bracket 160 helps electrically connect the flex cable 161 with the control module 163. Accordingly, according to some examples, the flex bracket 160 supports additional electrical circuitry (e.g., printed circuit boards) that provide for transmission of electrical signals from the flex cable 161 to the control module 163.

Figure 3:
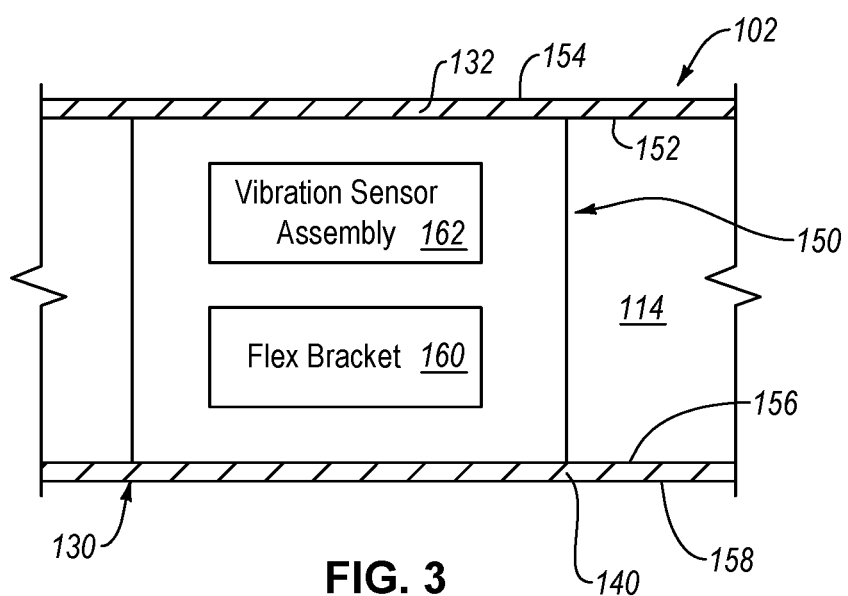
FIG. 3 is a side elevation, schematic view of the magnetic storage device of FIG. 1, according to one or more examples of the present disclosure.

Referring now to FIG. 3, in some examples, the flex bracket 160 forms part of a vibration sensor system 150 of the magnetic storage device 100. The vibration sensor system 150 is fixed to the base plate 140 of the base 130 and is in contact with the cover 132. In other words, the vibration sensor system 150 extends from the base plate 140 to the cover 132. The vibration sensor system 150 also includes a vibration sensor assembly 162. Accordingly, the vibration sensor system 150 includes the flex bracket 160 and the vibration sensor assembly 162. The vibration sensor assembly 162 is coupled with (e.g., is in contact with) the flex bracket 160 and includes a vibration sensor 166 (see, e.g., FIG. 10). The vibration sensor 166 is engaged with the flex bracket 160. Moreover, the vibration sensor 166 is configured to detect vibration of the cover 132. Generally, the contact between the vibration sensor system 150 and the cover 132, and the engagement between the vibration sensor 166 and the flex bracket 160, enables the vibration sensor 166 to detect vibration of the cover 132. According to some examples, engagement between the vibration sensor 166 and the flex bracket 160 enables the vibration sensor 166 to detect relative movement between the flex bracket 160 and the cover 132 (see, e.g., FIGS. 4-7) or enables the vibration sensor 166 to detect deformation of the flex bracket 160 (see, e.g., FIGS. 8 and 9).

Figure 4:
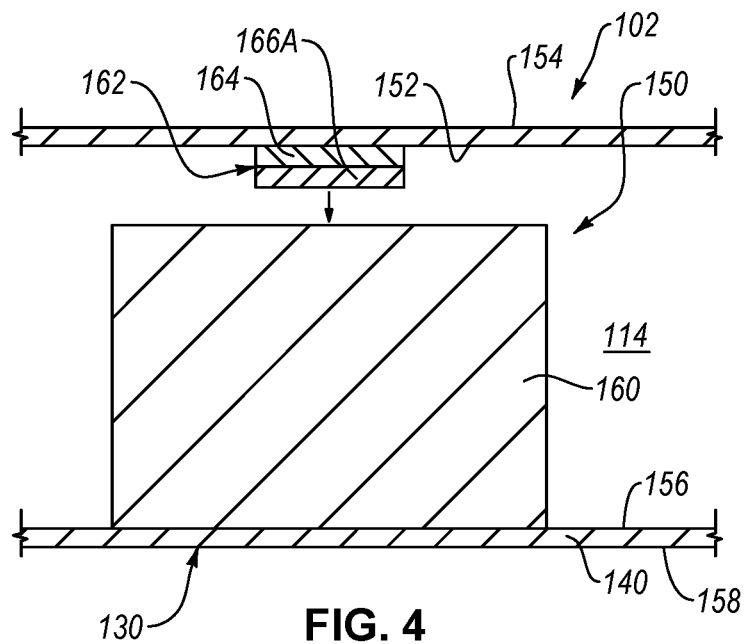
FIG. 4 is a side elevation, schematic view of the magnetic storage device of FIG. 1, shown with a cover removed from a housing of the magnetic storage device, according to one or more examples of the present disclosure.
Figure 5:
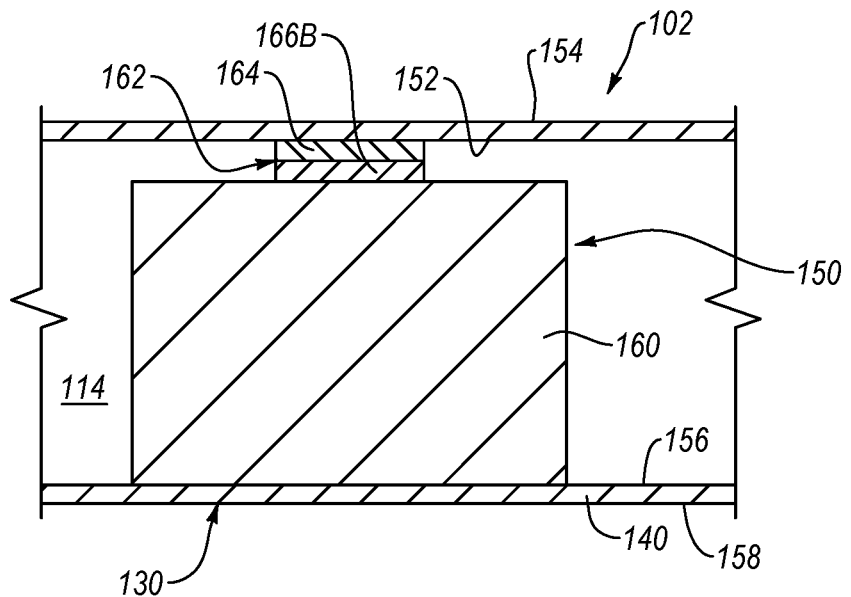
FIG. 5 is a side elevation, schematic view of the magnetic storage device of FIG. 1, according to one or more examples of the present disclosure.

As shown in FIGS. 4 and 5, in some examples, the vibration sensor assembly 162 is fixed to an inside surface 152 of the cover 132 such that the vibration sensor assembly 162 does not move relative to the cover 132. The inside surface 152 of the cover 132 is opposite an outside surface 154 of the cover. In these examples, the vibration sensor 166 of the vibration sensor assembly 162 is a force sensor 166A. Moreover, the vibration sensor assembly 162 further includes a sensor mount 164. The sensor mount 164 is any of various structures or materials that enable fixation (e.g., attachment) of the force sensor 166A to the cover 132. In one example, the sensor mount 164 is an adhesive (e.g., epoxy, glue, etc.). In another example, the sensor mount 164 is a structure fastened to, adhered to, bonded to, or otherwise coupled to the cover 132. According to yet another example, the sensor mount 164 is a structure (e.g., bracket) integrated into the cover 132.

The force sensor 166A is any of various sensors or transducers configured to detect changes in impact force. Accordingly, the force sensor 166A can include piezoresistive means, piezoelectric means, or strain gauges that enable the detection of changes in force. In some examples, the force sensor 166A is one of a piezoelectric quartz force sensor or a polyvinylidene fluoride (PVDF) film sensor.

The force sensor 166A of the vibration sensor assembly 162 is fixed to the cover 132 at a location corresponding with the location of the flex bracket 160. Additionally, the force sensor 166A is located a distance off of the cover 132, via the sensor mount 164, that corresponds with a height of the flex bracket 160. In this manner, as the cover 132 is attached to the base 130 to enclose the interior cavity 114, as shown in the transition from FIG. 4 to FIG. 5, the force sensor 166A is brought into contact with the flex bracket 160. In some examples, the force sensor 166A contacts an uppermost surface of the flex bracket 160. The contact between the force sensor 166A and the flex bracket 160 can be direct, such that no other intervening material or structure is between the force sensor 166A and the flex bracket 160, or indirect, such that an intervening material or structure can be between the force sensor 166A and the flex bracket 160, as long as vibration of the cover 132 results in changes in impact force sensed by the force sensor 166A.

Generally, when the cover 132 vibrates due to fan noise, the cover 132 vibrates or moves relative to the flex bracket 160. Because the force sensor 166A does not move relative to the cover 132, when the cover 132 moves relative to the flex bracket 160, the force sensor 166A correspondingly moves relative to the flex bracket 160. Movement of the force sensor 166A, such as away from and toward the flex bracket 160, results in changes in the force detected by the force sensor 166A. In this manner, the force sensor 166A is enabled to detect vibration of the cover 132.

Figure 6:
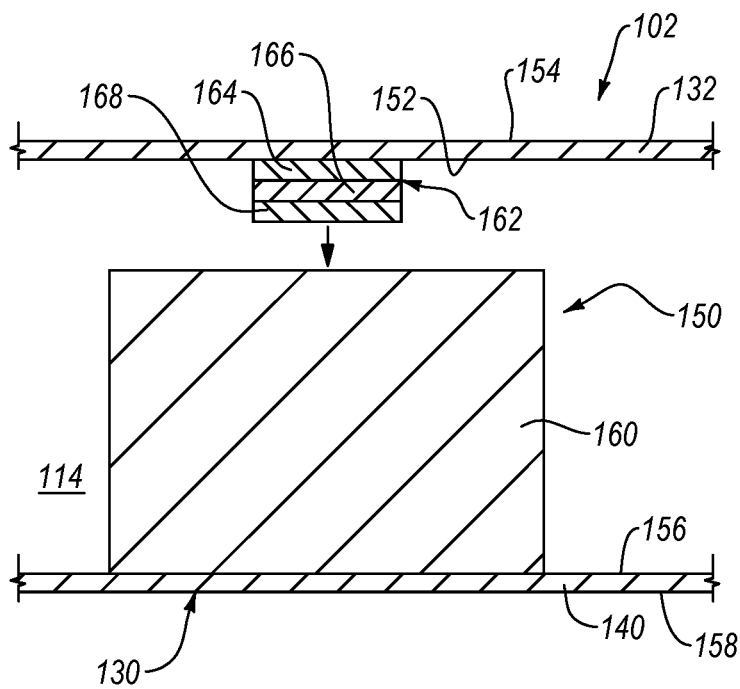
FIG. 6 is a side elevation, schematic view of the magnetic storage device of FIG. 1, shown with a cover removed from a housing of the magnetic storage device, according to one or more examples of the present disclosure.
Figure 7:
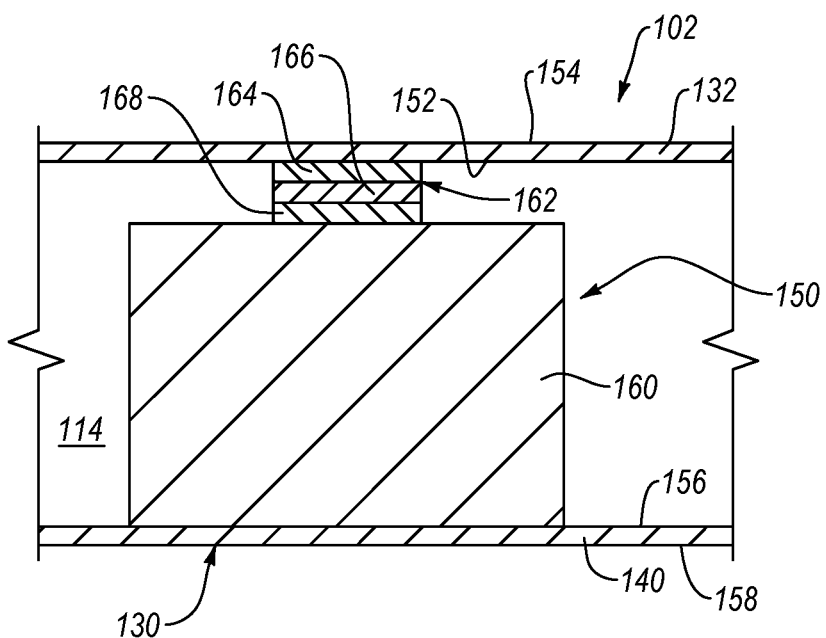
FIG. 7 is a side elevation, schematic view of the magnetic storage device of FIG. 1, according to one or more examples of the present disclosure.

Similar to the vibration sensor assembly 162 of FIGS. 4 and 5, in some examples, the vibration sensor assembly 162 of FIGS. 6 and 7 is fixed to the inside surface 152 of the cover 132 such that the vibration sensor assembly 162 does not move relative to the cover 132. In the examples in FIGS. 6 and 7, the vibration sensor 166 of the vibration sensor assembly 162 is an acceleration sensor 166B or accelerometer. The vibration sensor assembly 162 also includes the sensor mount 164, which, as disclosed above, can be any of various structures or materials that enable fixation (e.g., attachment) of the acceleration sensor 166B to the cover 132. Unlike the vibration sensor assembly 162 of FIGS. 4 and 5, the vibration sensor assembly 162 of FIGS. 6 and 7 additionally includes a compliant member 168. The compliant member 168 is fixed to the acceleration sensor 166B, in some examples. Moreover, the compliant member 168 is made of a material that is more flexible than the acceleration sensor 166B and the flex bracket 160. In certain examples, the compliant member 168 is made of a rubber or foam.

The acceleration sensor 166B is any of various sensors or transducers configured to detect proper acceleration. Accordingly, the acceleration sensor 166B can any of various sensors that enable the detection of acceleration of the cover 132. In some examples, the acceleration sensor 166B is a piezoelectric ceramic/quartz sensor, or a MEMS-style acceleration sensor.

The acceleration sensor 166B of the vibration sensor assembly 162 is fixed to the cover 132 at a location corresponding with the location of the flex bracket 160. Additionally, the compliant member 168 is located a distance off of the cover 132, via the sensor mount 164, that corresponds with a height of the flex bracket 160. In this manner, as the cover 132 is attached to the base 130 to enclose the interior cavity 114, as shown in the transition from FIG. 6 to FIG. 7, the compliant member 168 is brought into contact with the flex bracket 160. In some examples, the compliant member 168 contacts an uppermost surface of the flex bracket 160. In an alternative example, the compliant member 168 is fixed to the flex bracket 160 initially, such that as the cover 132 is attached to the base 130, the acceleration sensor 166B comes in contact with the compliant member 168.

Generally, when the cover 132 vibrates due to fan noise, the cover 132 vibrates or moves relative to the flex bracket 160. Because the acceleration sensor 166B does not move relative to the cover 132, when the cover 132 moves relative to the flex bracket 160, the acceleration sensor 166B correspondingly moves relative to the flex bracket 160. The compliant member 168 flexes to allow the acceleration sensor 166B to move relative to the flex bracket 160, but maintains coupling between the acceleration sensor 166B and the flex bracket 160 to ensure the acceleration detected by the acceleration sensor 166B is acceleration relative to the flex bracket 160. Accordingly, movement of the acceleration sensor 166B, such as away from and toward the flex bracket 160, results in acceleration, relative to the flex bracket 160, detected by the acceleration sensor 166B. Because the acceleration correlates to vibration in the cover 132, relative to the flex bracket 160, the acceleration sensor 166B is enabled to detect vibration of the cover 132 relative to the flex bracket 160.

Figure 8:
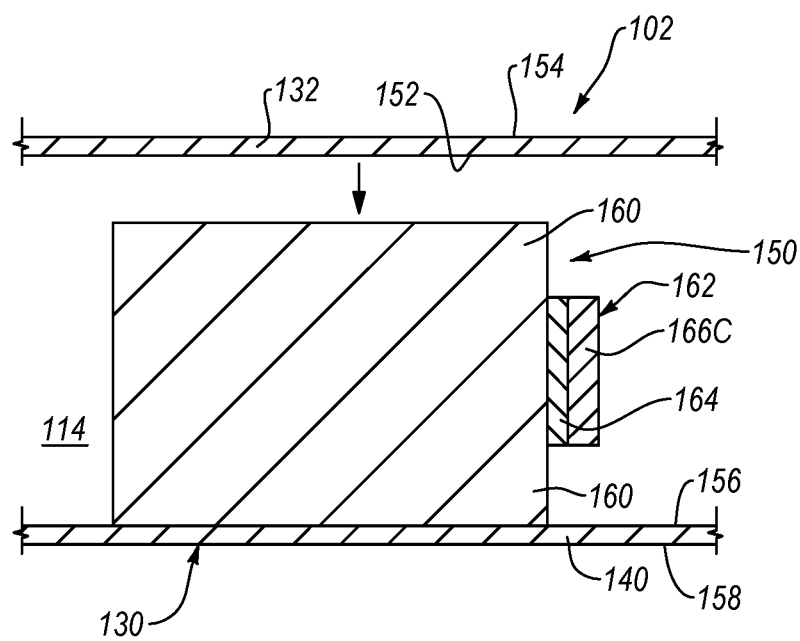
FIG. 8 is a side elevation, schematic view of the magnetic storage device of FIG. 1, shown with a cover removed from a housing of the magnetic storage device, according to one or more examples of the present disclosure.
Figure 9:
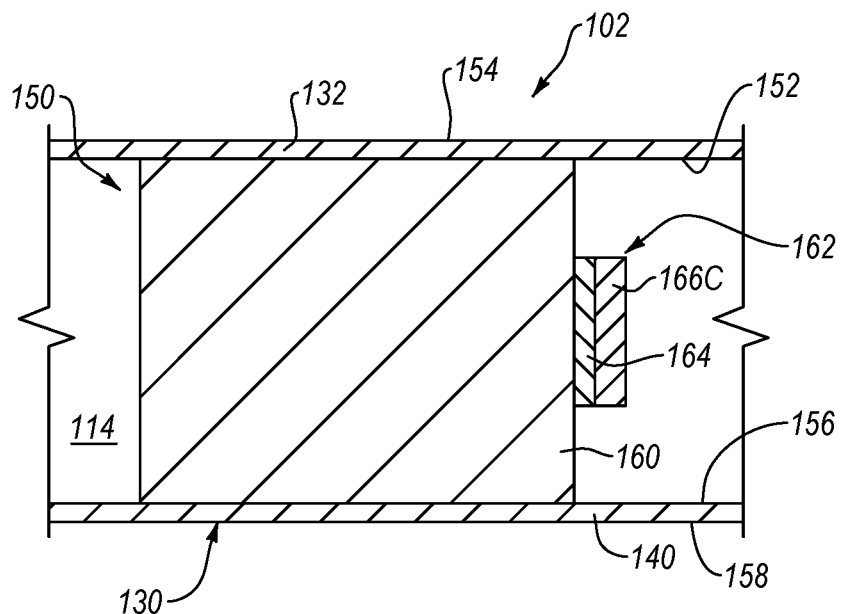
FIG. 9 is a side elevation, schematic view of the magnetic storage device of FIG. 1, according to one or more examples of the present disclosure.

Unlike the vibration sensor assembly 162 of FIGS. 4-7, in some examples, the vibration sensor assembly 162 of FIGS. 8 and 9 is fixed to the flex bracket 160 such that the vibration sensor assembly 162 does not move relative to the flex bracket 160. In the examples in FIGS. 8 and 9, the vibration sensor 166 of the vibration sensor assembly 162 is a strain sensor 166C or strain gauge. The vibration sensor assembly 162 also includes the sensor mount 164, which can be any of various structures or materials that enable fixation (e.g., attachment) of the strain sensor 166C to the flex bracket 160.

The strain sensor 166C is any of various sensors or transducers configured to detect changes in strain, such as, for example, changes in tension forces. Accordingly, the strain sensor 166C can any of various sensors that enable the detection of changes in strain of the flex bracket 160. In one example, the strain sensor 166C is one of a strain gauge or a PVDF film sensor. Changes in strain of the flex bracket 160 occur as the flex bracket 160 deforms. Generally, the strain sensor 166C is configured to deform in the same manner as the flex bracket 160. For example, the strain sensor 166C can include a foil that deforms along with deformation of the flex bracket 160, which causes an electrical resistance through the foil to change. The change is resistance through the foil is detected by the strain sensor 166C, which is converted into a change in the strain of the foil and thus a change in strain of the object to which the strain sensor 166C is attached, which in this case is the flex bracket 160.

The strain sensor 166C of the vibration sensor assembly 162 is fixed to the flex bracket 160 at a location away from the cover 132, such that the strain sensor 166C is spaced apart from the cover 132. The height of the flex bracket 160 is substantially equal to the thickness of the interior cavity 114 (i.e., the distance from the inside surface 156 of the base plate 140 to the inside surface 152 of the cover 132 at the location of the flex bracket 160). In this manner, as the cover 132 is attached to the base 130 to enclose the interior cavity 114, as shown in the transition from FIG. 8 to FIG. 9, the cover 132 is brought into contact with the flex bracket 160.

Generally, when the cover 132 vibrates due to fan noise, vibration of the cover 132 is transmitted into the flex bracket 160 due to the physical contact between the cover 132 and the flex bracket 160. Because the strain sensor 166C does not move relative to the flex bracket 160, when the flex bracket 160 moves (e.g., deforms) in response to vibration of the cover 132, the strain sensor 166C correspondingly moves (e.g., deforms) and detects such deformation. Because the deformation of the flex bracket 160, being in contact with the cover 132, corresponds with vibration of the cover 132, the strain sensor 166C is enabled to detect vibration of the cover 132 relative to the flex bracket 160.

Figure 10:
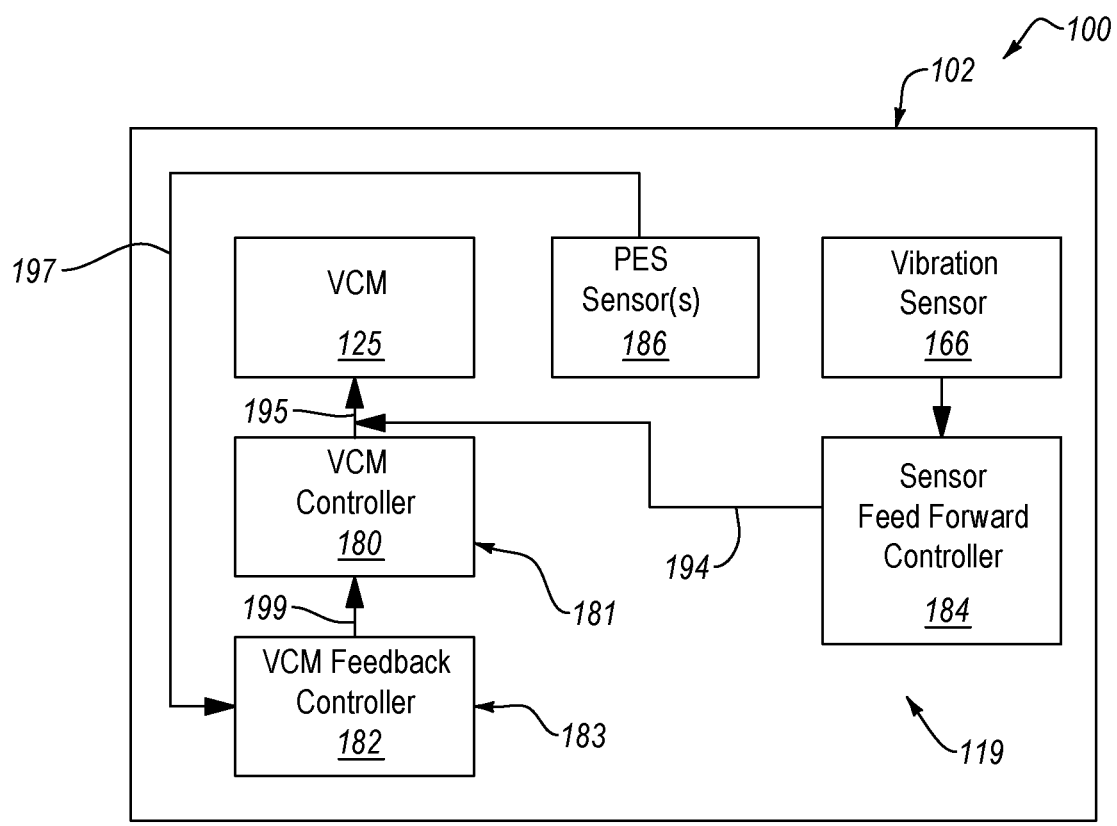
FIG. 10 is a block diagram of a magnetic storage device, according to one or more examples of the present disclosure.

Referring to FIG. 10, a control system 119 of the magnetic storage device 100 is shown. The control system 119 includes the vibration sensor 166, which as presented above, can be any of various sensors enabled to detect vibration of the cover 132, such as one or more of the force sensor 166A, the acceleration sensor 166B, and the strain sensor 166C.

The vibration sensor 166 detects vibration of the cover 132 and generates a sensor signal 192 (see, e.g., FIG. 11), which is an electronic signal that includes data representing the vibration of the cover 132 detected by the vibration sensor 166. The control system 119 further includes a sensor feedforward controller 184 that receives and processes the sensor signal 192 from the vibration sensor 166. The sensor feedforward controller 184 generates a gain signal 194 based on the vibration of the cover 132 identified by the sensor signal 192. Accordingly, the gain signal 194 is an alternative representation of vibration of the cover 132.

Figure 11:
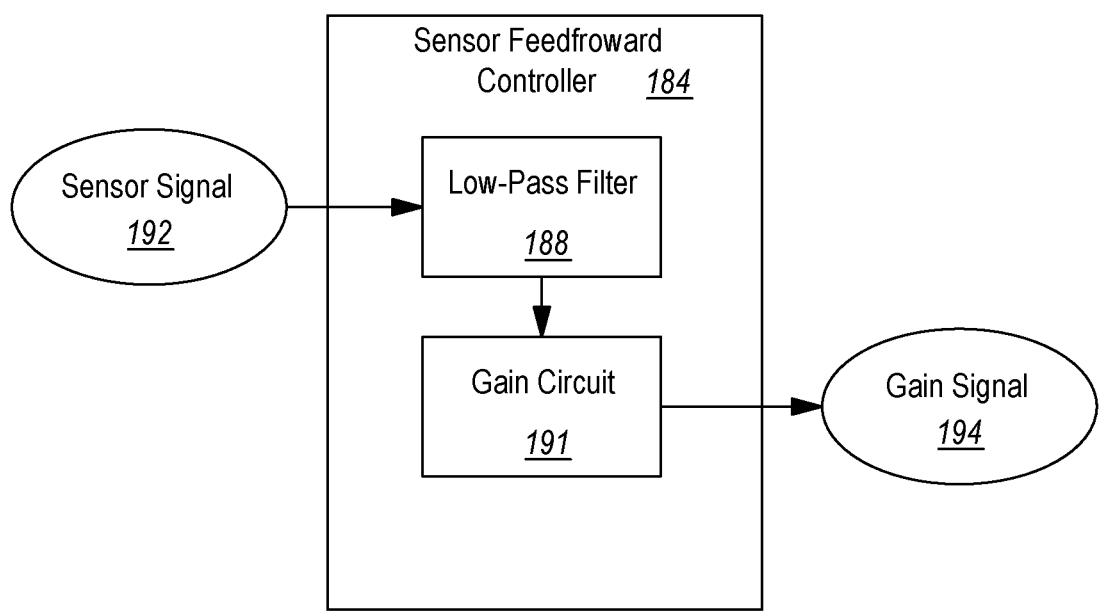
FIG. 11 is a block diagram of a sensor feedforward controller of a magnetic storage device, according to one or more examples of the present disclosure.

Referring to FIG. 11, in some examples, the sensor feedforward controller 184 includes a low-pass filter 188 and a gain circuit 191. The low-pass filter 188 receives the sensor signal 192 from the vibration sensor 166 and passes portions of the sensor signal 192 below a predetermined cutoff frequency. Accordingly, the low-pass filter 188 helps to smooth the sensor signal by removing short-term fluctuations. The gain circuit 191 (e.g., amplifier), which can be integrated into the low-pass filter 188 or can be a stand-alone electrical circuit, receives the filtered signal from the low-pass filter 188 and introduces a gain to the filtered signal to produce the gain signal 194. Therefore, the gain circuit 191 increases the power or amplitude of the filtered signal.

The control system 119 additionally includes an actuator controller 181, which in some examples, is a VCM controller 180, that generates an actuator command signal 195. The actuator command signal 195 is received by an actuator (e.g., the VCM 125), which operates in response to the actuator command signal 195. In this manner, the actuator controller 181 (e.g., the VCM controller 180) controls operation of a corresponding actuator (e.g., the VCM 125).

As disclosed above, the VCM 125 operates to actuate the carriage 103, which controls the position of the sliders 142 and corresponding read-write heads of the sliders 142. Generally, in some examples, the actuator command signal 195 controls the VCM 125 to position the sliders 142 in a desired position relative to the disks 115. However, as disclosed above, the actual position of the sliders 142 relative to the disks 115 can be different than the desired position of the sliders 142 relative to the disks 115, for various reasons. Accordingly, in some examples, the control system 119 further includes at least one position error signal (PES) sensor 186 that is configured to detect a difference between the actual (e.g., measured) position of the sliders 142 and the desired (e.g., commanded) position of the sliders 142, and generate a PES 197 based on (e.g., representative of) the detected difference. The PES 197 is received by an actuator feedback controller 183, such as a VCM feedback controller 182, which generates an actuator feedback control signal 199 based on the PES 197. The actuator controller 181 utilizes the actuator feedback control signal 199 as an input in determining and generating the actuator command signal 195. In this manner, a position error detected by the PES sensor 186 can be factored into the generation of the actuator command signal 195, as feedback, to help correct the position error of the sliders 142.

But, as indicated above, feedback control mechanisms, facilitated by the PES sensor 186 and the actuator feedback controller 183, sometimes are not capable of sufficiently correcting position errors caused by vibration of the cover 132 due to fan noise, or other vibration sources. Accordingly, the vibration sensor 166 and the sensor feedforward controller 184 can be utilized to enable feedforward control of actuators, such as the VCM 125, that results in an elimination of position errors of sliders 142 caused by fan noise, thus, in certain examples, enabling feedback control mechanisms to correct for position errors causes by other sources. The feedforward control includes modifying the actuator command signal 195 from the actuator controller 181, after the actuator command signal 195 is generated by the actuator controller 181, proportional to the gain signal 194 generated by the sensor feedforward controller 184. Because the modification to the actuator command signal 195 is proportional to the gain signal 194, the gain provided by the gain circuit 191 of the sensor feedforward controller 184 corresponds with the power or amplitude of the actuator command signal 195 generated by the actuator controller 181. This way, when the gain signal 195 modifies the actuator command signal 195, the actuator command signal 195, following modification, properly accounts for position errors of the sliders 142 potentially caused by fan noise and vibration of the cover 132. In some examples, depending on the configuration of the actuator and the actuator command signal 195, the sensor feedforward controller 184 modifies the actuator command signal 195 by adding the gain signal 194 to the actuator command signal 195. In yet some examples, depending on the configuration of the actuator and the actuator command signal 195, the sensor feedforward controller 184 modifies the actuator command signal 195 by subtracting the gain signal 194 to the actuator command signal 195 (or, as alternatively defined herein, adding a negative gain to the actuator command signal 195).

Figure 12:
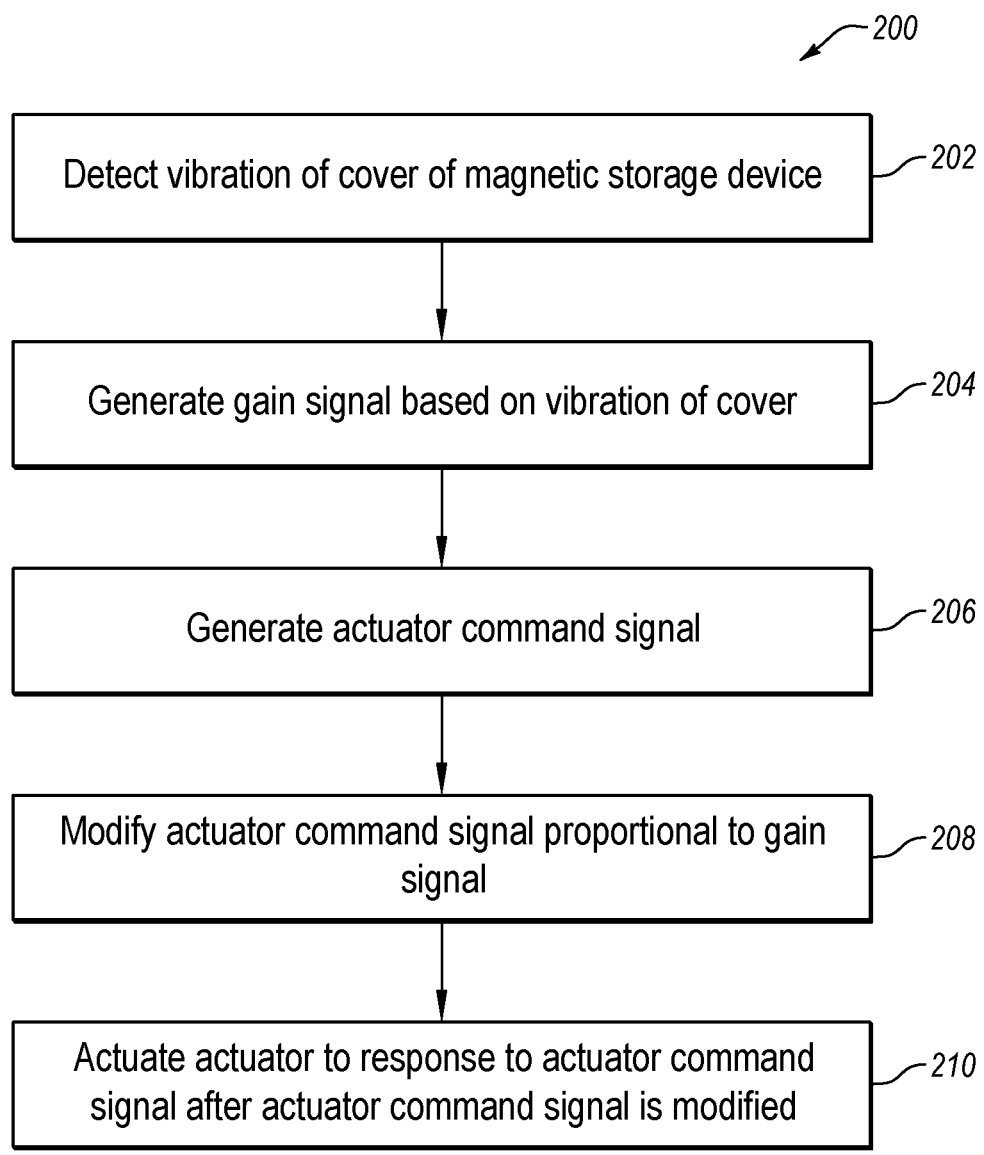
FIG. 12 is a schematic flow chart of a method of reducing position error of an actuatable component of a magnetic storage device, according to one or more examples of the present disclosure.

Referring to FIG. 12, according to some examples, a method 200 of reducing position error of the actuatable component 196 of the magnetic storage device 100 is shown. The method 200 includes (block 202) detecting vibration of the cover 132 of the magnetic storage device 100. Detection of vibration of the cover 132 is provided the sensor 166, which can be one of the force sensor 166A, the acceleration sensor 166B, or the strain sensor 166C. Therefore, vibration of the cover 132 can be detected by one of sensing relative movement between the flex bracket and the cover 132 or sensing deformation of the flex bracket 160. The method 200 additionally includes (block 204) generating the gain signal 194 based on the vibration of the cover 132, as detected by the sensor 166, for example. The method 200 further includes (block 206) generating the actuator command signal 195, which can be based on the PES 197. The method 200 also includes (block 208) modifying the actuator command signal 195 proportional to the gain signal 194, such as by adding the gain signal 194 to the actuator command signal 195 in some examples. Accordingly, the gain signal 194 modifies the actuator command signal 195 after the actuator command signal 195 is generated by the actuator controller 181. In this manner, modification to the actuator command signal 195 by the sensor feedforward controller 184 is independent of generation of the actuator feedback control signal 199 by the actuator feedback controller 183 and independent of generation of the actuator command signal 195 by the actuator controller 181. In other words, operation of the actuator feedback controller 183 and the actuator controller 181 is blind to the operation of the feedforward controller 184. Finally, the method 200 includes (block 210) actuating the actuator 198 in response to the actuator command signal after the actuator command signal 195 is modified.

Although VCM is described as an example actuator above, in other embodiments the feedforward/control mechanisms may be used to control other actuators such as the milli-actuators, micro-actuators, and/or fly-height actuators used to control the movement of the sliders and the associated recording heads. Such actuators may be based on piezoelectric means, and/or thermal expansion/contraction means. This can be done either in lieu of, or in addition to, the VCM feedforward/control mechanisms described.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. Examples of the scope of the present subject matter can be found in the following claims.

What is claimed is:

1. A magnetic storage device, comprising:
    a housing, comprising a base, a cover enclosing the base, and an interior cavity defined between the base and the cover;
    an actuator controller, located in the interior cavity and configured to generate an actuator command signal;
    an actuatable component, located in the interior cavity;
    an actuator, located in the interior cavity and operable to actuate the actuatable component in response to the actuator command signal;
    a vibration sensor, located in the interior cavity and configured to detect a vibration of the cover; and
    a sensor feedforward controller, located in the interior cavity and configured to generate a gain signal, based on the vibration of the cover detected by the vibration sensor, and to modify the actuator command signal proportional to the gain signal.

2. The magnetic storage device according to claim 1, wherein:
    the sensor feedforward controller comprises a low-pass filter and a gain circuit that cooperatively convert a sensor signal, representing the vibration of the cover detected by the vibration sensor, from the vibration sensor to a gain signal; and
    the sensor feedforward controller modifies the actuator command signal by adding the gain signal to the actuator command signal.

3. The magnetic storage device according to claim 1, further comprising:
    a position error signal (PES) sensor, located in the interior cavity and configured to generate a PES based on an error in a sensed position of the actuatable component being different than an expected position of the actuatable component; and
    an actuator feedback controller, located in the interior cavity and configured to generate an actuator feedback control signal based on the PES,
    wherein the actuator controller is configured to generate the actuator command signal based on the actuator feedback control signal.

4. The magnetic storage device according to claim 1, further comprising:
    a flex bracket, located in the interior cavity and fixed to the base; and
    a flex cable, located in the interior cavity, and coupled to and extending between the flex bracket and the actuatable component,
    wherein the vibration sensor is engaged with the flex bracket.

5. The magnetic storage device according to claim 4, wherein the vibration sensor is engaged with the flex bracket such that relative movement between the flex bracket and the cover is detected by the vibration sensor.

6. The magnetic storage device according to claim 5, wherein the vibration sensor is fixed to the cover such that the vibration sensor does not move relative to the cover.

7. The magnetic storage device according to claim 6, wherein:
    the vibration sensor is a force sensor;
    the force sensor is interposed between the cover and the flex bracket; and
    the force sensor directly contacts the flex bracket.

8. The magnetic storage device according to claim 6, wherein:
    the vibration sensor is an acceleration sensor;
    the magnetic storage device further comprises a compliant member, having a flexibility greater than that of the acceleration sensor and the flex bracket;
    the compliant member is fixed to the acceleration sensor;
    the acceleration sensor is interposed between the cover and the compliant member;
    the compliant member is interposed between the acceleration sensor and the flex bracket; and
    the compliant member directly contacts the flex bracket.

9. The magnetic storage device according to claim 4, wherein the vibration sensor is engaged with the flex bracket and is configured to detect deformation of the flex bracket.

10. The magnetic storage device according to claim 9, wherein:
    the vibration sensor is a strain sensor fixed to the flex bracket such that the strain sensor does not move relative to the flex bracket; and
    the flex bracket directly contacts the cover.

11. The magnetic storage device according to claim 1, wherein:
    the actuatable component comprises a carriage;
    the actuator comprises a voice coil motor (VCM); and
    the actuator controller comprises a VCM controller.

12. A magnetic storage device, comprising:
    a housing, comprising a base, a cover enclosing the base, and an interior cavity defined between the base and the cover;
    an actuatable component, located in the interior cavity;
    a flex bracket, located in the interior cavity and non-movably fixed to the base so that the flex bracket does not move relative to the base;

a flex cable, located in the interior cavity, and coupled to and extending between the flex bracket and the actuatable component; and a vibration sensor, located in the interior cavity and configured to detect a vibration of the cover, wherein the vibration sensor is engaged with the flex bracket such that relative movement between the flex bracket and the cover is detected by the vibration sensor or deformation of the flex bracket is detected by the vibration sensor.

13. The magnetic storage device according to claim 12, wherein:

the vibration sensor detects relative movement between the flex bracket and the cover;

the vibration sensor is a force sensor, fixed to the cover such that the force sensor does not move relative to the cover;

the force sensor is interposed between the cover and the flex bracket; and the force sensor directly contacts the flex bracket.

14. The magnetic storage device according to claim 12, wherein:

the vibration sensor detects relative movement between the flex bracket and the cover;

the vibration sensor is an acceleration sensor, fixed to the cover such that the acceleration sensor does not move relative to the cover;

the magnetic storage device further comprises a compliant member, having a flexibility greater than that of the acceleration sensor and the flex bracket;

the compliant member is fixed to the acceleration sensor;

the acceleration sensor is interposed between the cover and the compliant member;

the compliant member is interposed between the acceleration sensor and the flex bracket; and the compliant member directly contacts the flex bracket.

15. The magnetic storage device according to claim 12, wherein:

the vibration sensor detects deformation of the flex bracket;

the vibration sensor is a strain sensor fixed to the flex bracket such that the strain sensor does not move relative to the flex bracket; and the flex bracket directly contacts the cover.

16. The magnetic storage device according to claim 12, wherein:

the actuatable component comprises a carriage;

the magnetic storage device further comprises a voice coil motor (VCM); and the magnetic storage device further comprises a VCM controller.

17. A method of reducing position error of an actuatable component of a magnetic storage device, the method comprising:

detecting vibration of a cover of the magnetic storage device, wherein the cover encloses a base of a housing, in which the actuatable component is located;

generating a gain signal, based on the vibration of the cover;

generating an actuator command signal;

modifying the actuator command signal proportional to the gain signal; and actuating the actuator in response to the actuator command signal after the actuator command signal is modified.

18. The method according to claim 17, wherein modifying the actuator command signal comprises adding the gain signal to the actuator command signal.

19. The method according to claim 17, further comprising:

sensing a position of the actuator; and generating a position error signal (PES) based on the position of the actuator, wherein the actuator command signal is generated based on the PES.

20. The method according to claim 17, wherein the vibration of the cover is detected by one of:

sensing relative movement between a flex bracket located in the housing and the cover of the housing; or sensing deformation of the flex bracket.

* * * * *